United States Patent
Arneson et al.

(10) Patent No.: US 6,785,395 B1
(45) Date of Patent: Aug. 31, 2004

(54) SPEAKER CONFIGURATION FOR A PORTABLE ELECTRONIC DEVICE

(75) Inventors: Theodore R. Arneson, Ivanhoe, IL (US); Mark A. Barabolak, Elmhurst, IL (US); Giles T. Davis, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/452,336

(22) Filed: Jun. 2, 2003

(51) Int. Cl.[7] .......................... H04R 25/00; H04M 1/00
(52) U.S. Cl. .................. 381/334; 381/386; 381/339; 381/345; 381/374; 381/395; 379/432; 455/90.3
(58) Field of Search .................. 381/334–338, 381/396, 395, 388, 398, 152, 345, 386, 391, 182, 412, 420, 348, 349–351, 371, 372, 417, 160, 346, 347, 357; 29/394; 455/90.3, 575.1; 340/388.1, 391.1; 181/155, 156, 145; 379/431, 432, 433, 430, 433.62

(56) References Cited

U.S. PATENT DOCUMENTS

| | | | |
|---|---|---|---|
| 3,798,393 A | | 3/1974 | Gorike |
| 3,987,258 A | * | 10/1976 | Tsutsui et al. .............. 381/334 |
| 4,005,278 A | | 1/1977 | Gorike |
| 4,239,945 A | | 12/1980 | Atoji et al. |
| 4,742,887 A | | 5/1988 | Yamagishi |
| 5,266,752 A | * | 11/1993 | Cussans ...................... 181/155 |
| 5,327,507 A | | 7/1994 | Suzuki |
| 5,369,701 A | | 11/1994 | McAteer et al. |
| 5,442,713 A | | 8/1995 | Patel et al. |
| 5,517,574 A | | 5/1996 | Tichy |
| 5,790,679 A | | 8/1998 | Hawker et al. |
| 5,844,998 A | * | 12/1998 | Nageno ...................... 381/371 |
| 5,905,805 A | * | 5/1999 | Hansen ....................... 381/398 |
| 5,949,897 A | | 9/1999 | Bartels et al. |
| 6,058,315 A | | 5/2000 | Clark |
| 6,134,336 A | * | 10/2000 | Clark ......................... 381/371 |
| 6,321,070 B1 | * | 11/2001 | Clark et al. .............. 455/575.1 |
| 6,389,145 B2 | * | 5/2002 | Baumhauer et al. ........ 381/345 |
| 6,493,456 B1 | * | 12/2002 | Hansson ..................... 381/345 |
| 6,628,790 B1 | * | 9/2003 | Klein .......................... 381/89 |
| 6,658,110 B1 | * | 12/2003 | Andersen ............... 379/433.02 |
| 6,711,274 B2 | * | 3/2004 | Asahina et al. ............ 381/386 |
| 6,744,895 B2 | * | 6/2004 | Miyamoto et al. .......... 381/182 |
| 6,744,904 B2 | * | 6/2004 | Kobayashi et al. ......... 381/396 |

* cited by examiner

*Primary Examiner*—Huyen Le
*Assistant Examiner*—Dionne Harvey
(74) *Attorney, Agent, or Firm*—Brian M. Mancini (57) ABSTRACT

A portable device includes a speaker with an active vent fed by a front of a speaker diaphragm and a larger passive vent fed by a rear of the speaker diaphragm. The outputs of the active and passive vents are acoustically coupled to respective active and passive ports, coupled together outside of the housing within an ear placement region for a user of the portable electronic device to obtain a more uniform frequency response from the speaker configuration over a larger region of a user's ear placement possibilities than would be available with the active vent alone. This is accomplished by a close acoustic coupling of the ports in combination with diverse porting of active and passive acoustic signals. The passive path also serves to relieve pressure near a user's ear to improve signal quality.

20 Claims, 5 Drawing Sheets

SPEAKER CONFIGURATION FOR A PORTABLE ELECTRONIC DEVICE

FIELD OF THE INVENTION

The present invention relates generally to the field of speakers for portable electronic devices.

BACKGROUND OF THE INVENTION

A handheld portable electronic device, such as a portable radiotelephone, employs a speaker to convert electrical signals into sound waves in the human-audible frequency range of 20 Hertz (Hz) to 20 kilohertz (kHz). The speaker enables a user of the radiotelephone to hear a representation of a caller's voice, as well as other sounds such as dial tones. The quality of the sound reproduction is an important factor in a customer's decision to buy a portable radiotelephone. Audio quality of a speaker is determined by its frequency response over the audible frequency range. Manufacturers of speakers normally provide a specified frequency response of a speaker when it is used in a "free-field" environment. Speakers employed in radiotelephones, however, are rarely used in a free-field environment. Instead, the user places the radiotelephone against his ear to hear the sound, and the speaker is positioned very close to the human ear.

The goal of an acoustic engineer in the radiotelephone field is to choose the combination of speaker, enclosure, and preconditioning electrical circuitry that provides an acceptable audio quality. An acceptable audio quality is usually a measure of how flat, or variable, the frequency response of the speaker is in its environment over the frequency range of 300 Hz to 4 kHz. The flatter, or less variation, of the frequency response, the better the audio quality. A frequency response that is higher, or boosted, in the low frequencies than in the high frequencies will sound bassy and muffled; whereas a frequency response that is higher in the high frequencies than in the low frequencies will sound shrill and tinny.

Two types of speaker technology are in predominate use for handheld radiotelephones, piezoelectric speakers and dynamic speakers, both of which have a high free-air resonant frequency. Both speaker technologies are specified to work with an airtight seal between the speaker and the human ear. Achieving the airtight seal requires that the speaker have an airtight mount to the handheld radiotelephone housing and the radiotelephone housing have an airtight coupling where the housing meets the ear. The ear-housing coupling is achieved by forming a depression in the housing that conforms to the shape of the human ear. As long as the airtight seal is maintained, these types of speakers have been able to provide an acceptable frequency response.

As handheld radiotelephones become smaller in size, an airtight ear-housing coupling is difficult to achieve for all users because the housing is not large enough to form a depression in the housing surface that accommodates the size of all human ears. Consequently, for most users, air leakage occurs between the housing and the human ear, resulting in a loss of low frequency response resulting in a tinny sound.

A low acoustic impedance dynamic speaker (having a lower free air resonant frequency than a piezoelectric speaker) is designed to boost the frequency response at the low end of the frequency range, and can be used to remedy the bass loss caused by air leakage between the housing and the human ear. However, such a speaker, when mounted with an airtight seal between the speaker and the housing, exhibits excessive low frequency gain when an airtight seal is formed between the housing and the human ear. Consequently, the sound is bassy and muffled. Furthermore, there is a large variation between the highest and lowest point in the frequency response, thus the audio quality is poor.

In addition, the size of smaller handheld radiotelephones not only eliminates the seal between the housing and the human ear but also the size of the enclosure housing the speaker. Smaller handheld radiotelephones have less space to house the enclosure, and the size of the enclosure further degrades the frequency response of the speaker. Moreover, the frequency response can change significantly as the placement of the ear is moved away from a centered position over the speaker itself.

A need therefore exists for a speaker configuration for small handheld radiotelephones, which has limited sensitivity to placement of a user's ear in relation to the speaker diaphragm. It would also be of benefit if the speaker configuration is relatively insensitive to the degree of sealing between the user's ear and the housing of the radiotelephone, thereby providing acceptable audio quality.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a speaker configuration for a small handheld portable electronic device, such as radiotelephone, which has limited sensitivity to placement a user's ear in relation to a speaker port in a housing. In addition, the speaker configuration is relatively insensitive to the degree of sealing between the user's ear and the housing of the radiotelephone, thereby providing acceptable audio quality over a broad range of listening conditions. This improvement is accomplished through a novel configuration of vents and porting as will be described below.

Figure 1:
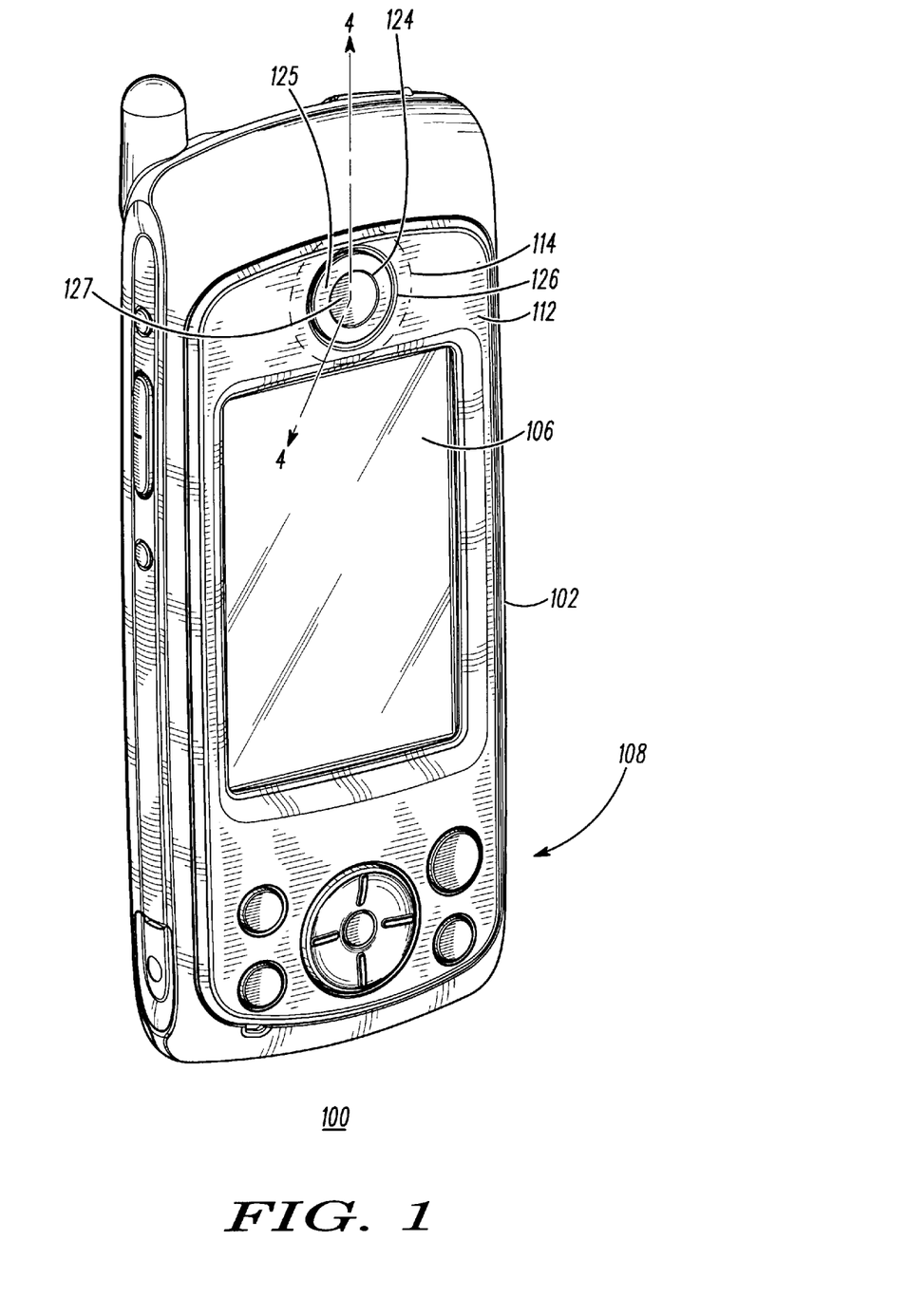
FIG. 1 is a front perspective view of a portable radiotelephone, in accordance with the present invention.

FIG. 1 shows a front perspective view of a portable electronic device 100, in accordance with the present invention. In particular, the portable electronic device 100 is a radiotelephone that provides for wireless communication via radio frequency (RF) signals. More particularly, the portable electronic device 100 is operable in cellular telephone systems and is commonly referred to as a portable cellular telephone.

Portable electronic device 100 has at least one housing 102 with a speaker configuration disposed therein. The housing can be of a one-piece design as shown or can include upper and lower housings rotatably connected via a hinge (not shown), in a configuration commonly referred to as a foldable or clamshell-style telephone, or in any configuration comprising one or more housings. However, as shown in FIG. 1, the present invention is adaptable to any portable electronic device having at least one housing 102. In this example, the device 100 includes a visual display 106 and a plurality of keys 108 provided on a surface of housing 102. Electrical circuitry (not shown) is incorporated into the device, which includes a radio receiver and possibly a radio transmitter (both coupled to an antenna), and audio circuitry disposed in housing 102 and supplied electrical energy from a detachable battery (not shown). Portable radiotelephone 100 is sized for handheld usage and may be referred to as a handheld portable radiotelephone.

The housing 102 is formed from a plastic and/or metal shell. A front surface 112 of housing 102 has an ear placement region 114 (as defined here in dashed lines of FIG. 1) which can roughly be described as a circle of about 25 mm in diameter, where an ear of a user is generally centered for listening to audible voice or tone signals. Ear placement region 114 is typically smaller or more irregular than a user's ear leading to sealing leaks between the housing and the ear.

In accordance with the present invention, an active port 124 and a passive port 126 are provided and defined by a first diffuser (escutcheon) 127 and a second diffuser 125 formed in the housing portion 102 and generally centrally positioned within ear placement region 114. The diffusers 125, 127 and ports 124, 126 operate in conjunction with internal vents to provide the improvement provided by the present invention. The passive vent 126 includes a substantially continuous gap porting through the housing that surrounds the active port 124. In practice, the active port 124 includes porting having a circular gap through the housing, and the porting of the passive port 126 forms a concentric circle about the active port, separated by the diffuser 125. The first diffuser and the second diffuser form the active port 124 therebetween. Similarly, the second diffuser and the housing form the passive port. In practice, proximal porting separation is desired, 3 mm being preferred. An escutcheon can be provided as the first diffuser 127 and to hold the second diffuser 125. The second diffuser 125 and escutcheon 127 can be attached to the housing 102 using adhesive, ultrasonic welding, mechanical clips or other suitable techniques. In addition, supplemental passive porting can be supplied over other surfaces of the housing.

Figure 2:
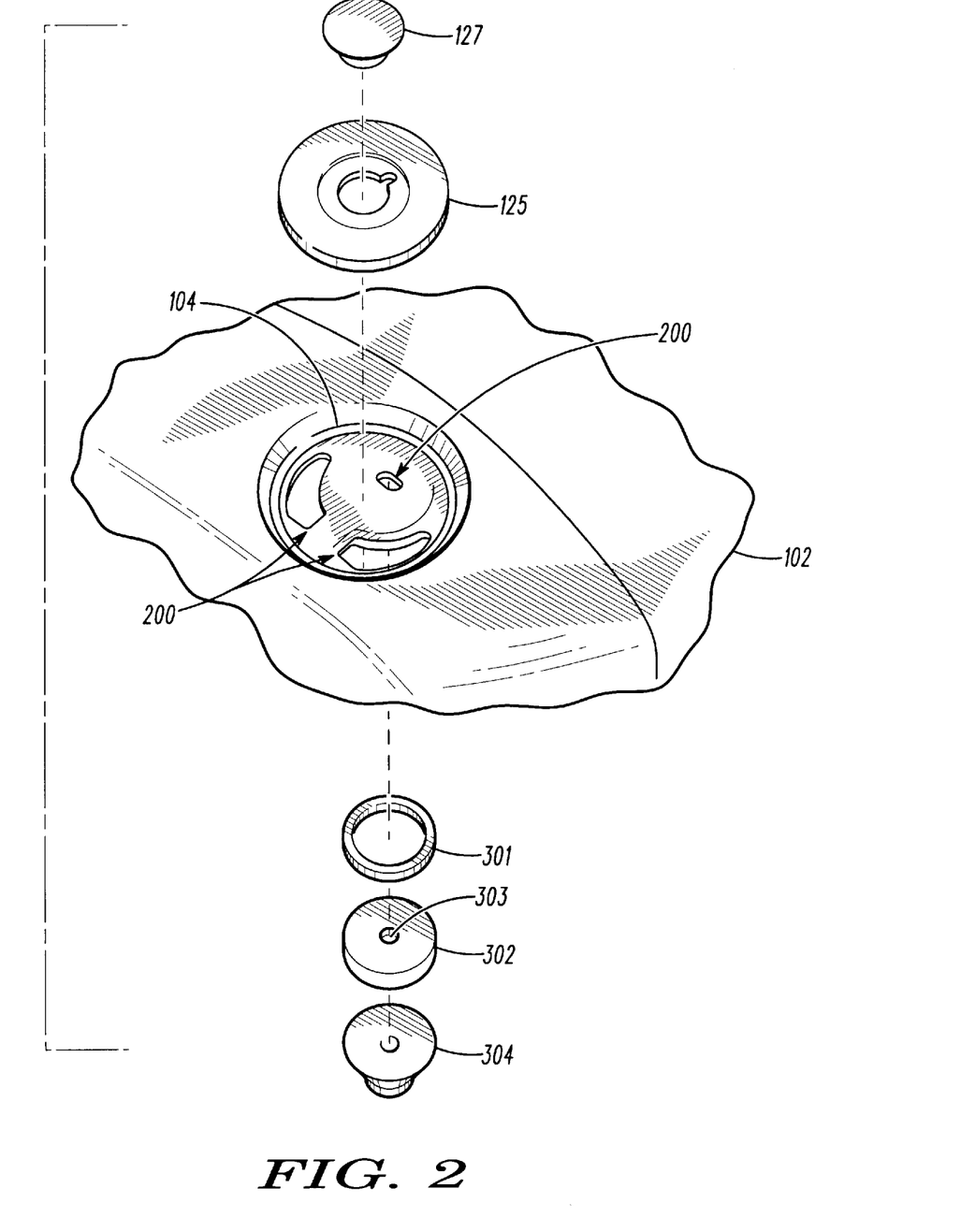
FIG. 2 is a perspective exploded view of the speaker assembly of FIG. 1.

FIG. 2 shows the speaker configuration of FIG. 1 exploded to show more detail, with the diffusers removed to show the internal vents of the housing. In its simplest embodiment, an active vent is disposed in the wall of the housing such that acoustic waves from a front of a speaker diaphragm can propagate through the active vent. At least one passive vent, of longer acoustic length from the speaker diaphragm than the active vent, is disposed in the wall such that acoustic waves produced from a rear side of the speaker diaphragm can propagate through the passive vent. Preferably, the active vent 200 is provided to acoustically couple with the active port 124 of FIG. 1 to pass acoustic waves to an outside of the housing in the ear placement region, and the at least one passive vent 202 is provided to acoustically couple with the second port 126 to pass acoustic waves to an outside of the housing in the ear placement region. The vents 200, 202 are formed within a recess 104 of the housing, such that the installation of the diffusers 125 will form a substantially flush surface on the outside of the housing 102 in the ear placement region 114.

A preferred embodiment of the present invention is having the active and passive ports 124, 126 acoustically couple to each other within the ear placement region 114. This acoustical coupling between the ports is provided by placing an output of the ports in proximity on the housing. More preferably, the passive ports can be thought of in terms of relieving acoustic pressure (present at the listener's ear due to the active vent and porting) back into the housing, through the housing, and then back out to the outside world. The active port disperses the active acoustic signal out through the housing and passive vent further disperses the passive acoustic signal to provide leak tolerance and to regulate the frequency response of the active signal.

A novel aspect of the present invention is coupling a relatively large active port to a relatively small active vent. The small active vent controls the upper frequency response of the speaker, and the large active port distributes the active vent's pressure over a larger area than the active vent can do by itself. The at least one passive vent subtends a larger area than for the first (active) vent. Preferably, the at least one passive vent provides an area of the output vent that is about twice that of the active vent. The passive vent is disposed in the wall of the housing such that acoustic waves present at the listener's ear due to the active vent can propagate back through the housing and then to the outside world. It should be recognized that the vents and ports can have many other configurations than those shown, including different number, sizes and locations. In accordance with the present invention, the ports 124, 126 are located in proximity to each other to provide for acoustic coupling therebetween.

As will be described later in reference to FIG. 3, the vents 200, 202 couple with their associated ports 124, 126 and diffusers 125, 127 to provide an improvement in acoustic response and quality by providing a larger usable ear placement region for a user of the portable electronic device to obtain a more uniform frequency response from the speaker configuration than would be available with an active vent alone. In effect, the active vent provides control of the frequency response of the speaker configuration, the active port tunes said frequency response and provides an extension of a usable area of the ear placement region of the speaker configuration, and the passive vent and port provides correction to the acoustic response. It is desired to place the exit passages of the active and passive ports close together while maximizing the area to which the combination of exit passages extends on the outside of the housing.

It may also be desired to add a third porting that couples to the passive path to relieve excessive low-frequency acoustic pressure between the ear placement region and the user's ear. Preferably, the third porting is vented in proximity to the passive porting. This serves to regulate the acoustic impedance between the ear placement region and the user's ear, such that the seal of the user's ear to the ear placement region is less critical to the uniformity of the frequency response. This regulation of excessive low-frequency acoustic pressure can be achieved in part through this third path, through cancellation of the front pressure wave with the rear pressure wave of the transducer, through an unusually larger interior volume of the phone, or any combination of the above.

The speaker type can be of many known types. For example, the speaker can be of a piezoelectric ceramic or can be a dynamically compliant type, for example, as are known in the art. As shown, the speaker itself includes an earpiece receiver with a diaphragm 304 that is attached to a basket (or frame) such that the diaphragm is able to vibrate per an input voltage stimulus, while the frame provides the means to seal the speaker to a baffle or volume, which can be made to isolate the front pressure wave from the rear pressure wave. The diaphragm is the only portion needed to demonstrate the invention, and is only shown to simplify the diagram. It is understood that, for example, the diaphragm can be a ceramic wafer attached or bonded to a thin, flexible metallic element to form a piezoelectric or "PZT" diaphragm, or the diaphragm can be of plastic or other suitable material as part of a dynamic speaker including a voice coil and magnetic motor assembly (as shown), as are known in the art. An outer edge of diaphragm 304 is affixed, through mechanical coupling or adhesive attachment to (e.g., glued or attached with a gasket) an inside surface of a wall of the housing 102. In this position, the front side of the speaker diaphragm is facing the wall of the housing. An optional speaker cap 302 can be employed to provide a sealed volume for the speaker with an outlet hole 303 that can serve as the active vent. This can be affixed to a spacer ring 301 connected to the inner wall of the housing to form a chamber between the speaker and the housing for tuning the frequency response of the speaker configuration. The rear of the speaker configuration is open to the housing of the device, which is coupled to the passive vents 202.

Terminals of a voice coil (for a dynamic speaker) or piezoelectric plate (for a piezo-type speaker) are coupled to electrical conductors (not shown), such as wires, disposed on the housing 102. The electrical conductors are coupled to audio circuitry (not shown) disposed in device. The electrical conductors (not shown) may be routed in housing 102 using suitable methods. For example, the electrical conductors may be insert-molded within the housing portion 102. Alternatively, the electrical conductors may be included in a flexible printed circuit board (not shown), which may be routed through a channel (not shown) formed in the housing 102. In addition, the diffusers 125, 127 could be used to cover the channel or, alternatively, the housing 102 may be formed to extend to cover the channel upon attachment. Terminals may be soldered to the electrical conductors of the diaphragm or the electromagnetic coil driving the diaphragm, for example, or coupled using an elastomeric connector.

Figure 3:
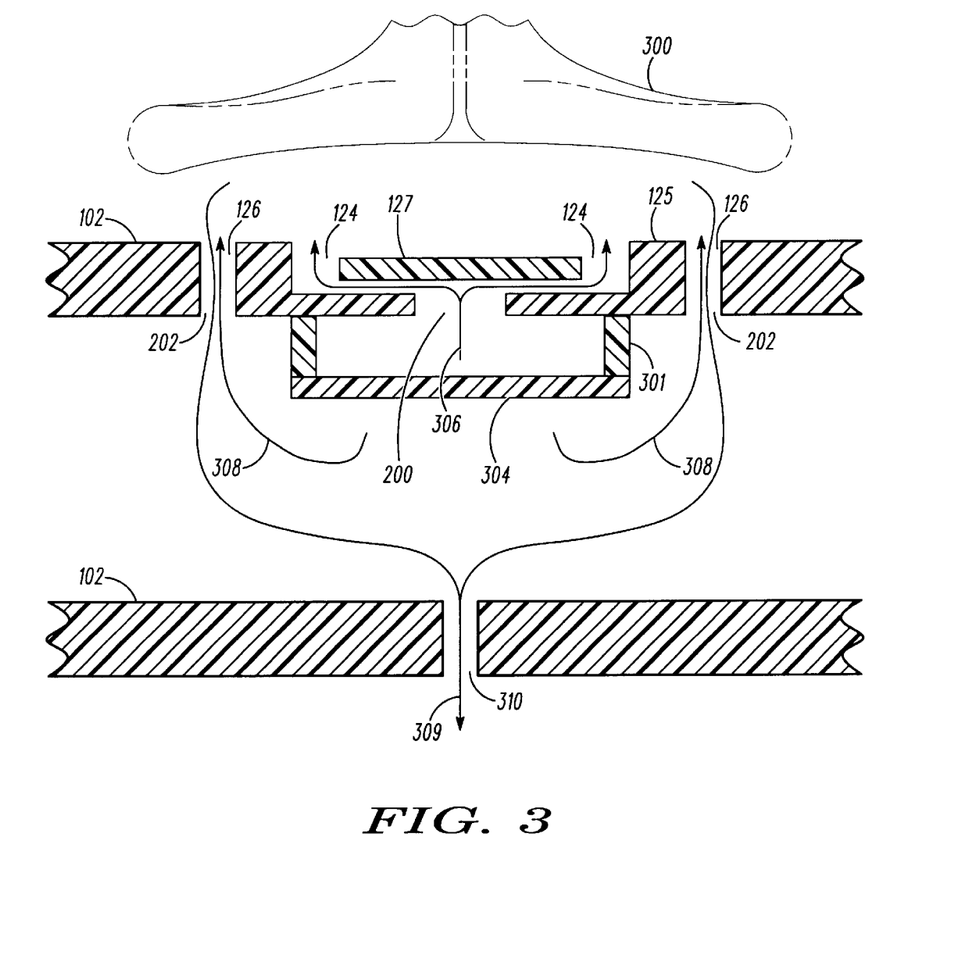
FIG. 3 is a cross sectional side view of a first embodiment of a speaker configuration, in accordance with the present invention.

FIG. 3 shows a simplified cross sectional view of a first embodiment of the present invention. Vents 200, 202 and ports 124, 126 of the housing 102 allow sound pressure waves to travel therethrough from the speaker diaphragm 304 to open air in the ear placement region. The speaker diaphragm 304 has a front side and a rear side. In this embodiment, passages 200, 202 are referred to as vents and passages 124, 126 are referred to as ports. For example, an active sound pressure wave 306 from a front side of the diaphragm 304 travels through active vent 200 and active port 124 around a first diffuser 127 in a substantially direct but dispersed manner to the user's ear 300. A sound pressure wave 308 from a rear side of the diaphragm 304 travels through at least one passive vent 202 and passive port 126 around the second diffuser 125 to the user's ear 300. For example, an active sound pressure wave 306 from a front side of the diaphragm 304 travels through active vent 200 and active port 124 around a first diffuser 127 in a substantially direct but dispersed manner to the user's ear 300, and then can continue through at least one passive vent 202 through housing 102 along path 309 through at least one vent 310. In general, the more venting 310 that is available, the better the frequency performance of the invention.

An operation of the speaker configuration is now described. Signals from the audio circuitry drive the diaphragm 304, resulting in sound pressure waves being generated from front and rear sides thereof. Sound pressure waves from the front side of diaphragm 304 travel through the passages 200, 124 in the housing portion 102. Sound pressure waves from the rear side of diaphragm 304 travel within the housing 102 of the device and travel through the passages 200, 124 in the housing portion 102 passively. The direct pressure wave 306 radiating from the active port 124 couples to the passive wave 308 radiating from the passive port 126 around the diffuser 127. The combination of the active and passive waves escapes to open air at the ear placement region.

Figure 4:
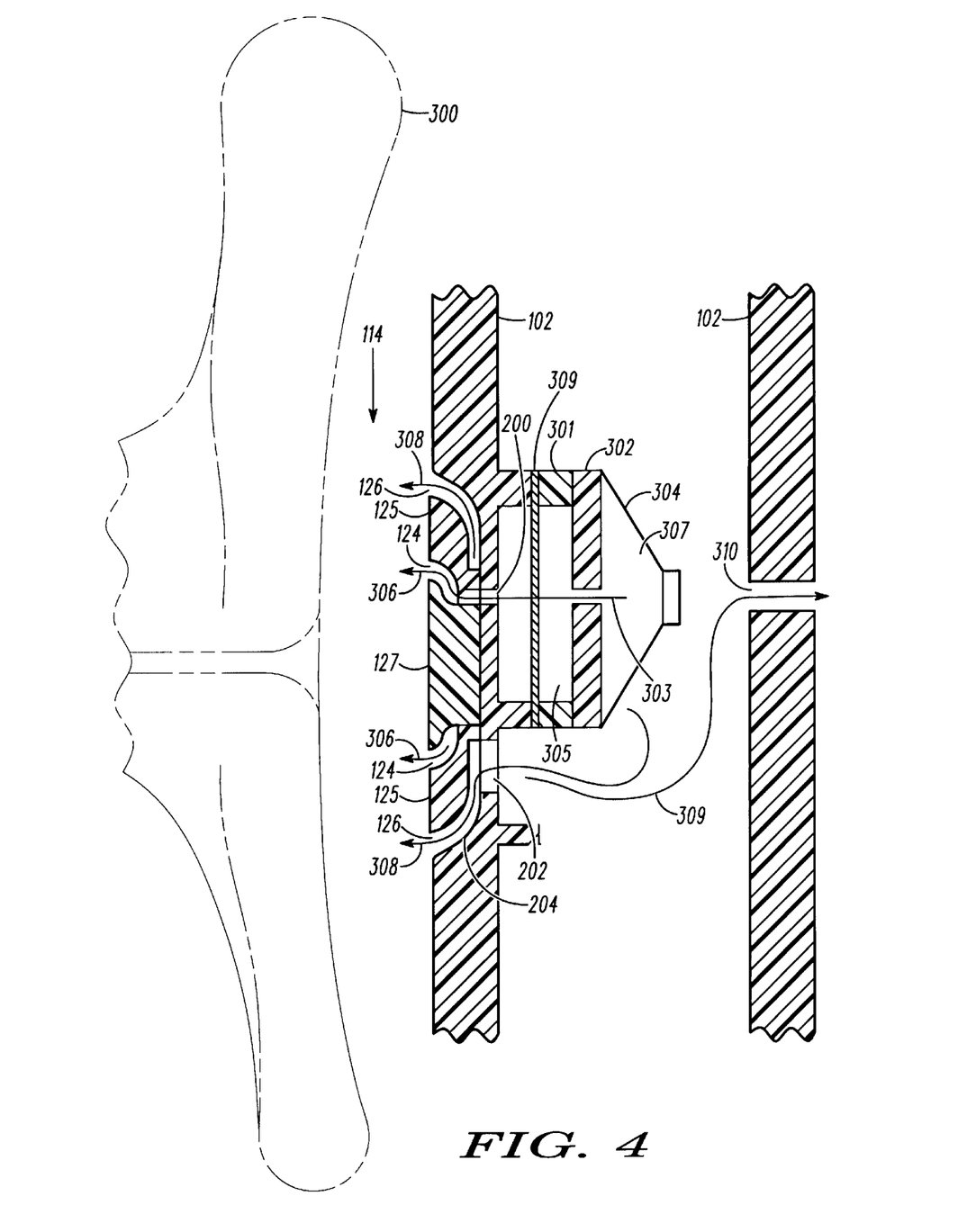
FIG. 4 is a cross sectional side view of a preferred embodiment of a speaker configuration of FIG. 1, taken along a line 4–4'.

FIG. 4 shows a cross sectional view of a preferred embodiment of the speaker configuration of the present invention taken along lines 4–4' of FIG. 1. Vents 200, 202, 303, chamber 305, and ports 124, 126 of the housing 102 allow sound pressure waves to travel therethrough from the speaker diaphragm 304 to open air in the ear placement region 114. The speaker diaphragm 304 has a front side and a rear side. In this embodiment, passages 200, 202, 303 are referred to as vents and passages 124, 126 are referred to as ports. For example, a sound pressure wave 306 from a front side of the diaphragm 304 travels through active vent 303 into chamber 305, vent 200, which is now part of active port 124 in a substantially direct and dispersed manner to the user's ear 300. In this case, vent 303 is the active vent and is smaller than vent 200. In particular, the active vent 303 has a smaller cross-sectional area than the active port 200, 124. The chamber 305 is disposed between the active vent 303 and active port 200, 124 to tune the frequency response of the speaker configuration. Specifically, the active vent 303 contributes to tuning the system's the high-frequency response, while the chamber 305 and active port 200, 124 contribute to tuning the system's low-frequency response.

The vent 303 and the volume 307 between the diaphragm 304 and the vent 303 determine the high frequency resonance of the speaker. Active vent 303 is used to control the high frequency resonance of the speaker configuration. Vent 303 has about a 1 mm diameter, given a high frequency peak typically around 4 kHz, slightly higher than desired. The chamber 305, vent 200, and active port 124 load and tune the speaker to yield the lower high frequency response that is desired. In this way, the active vent 303 and active port 200, 124 set a high frequency portion of the frequency response of the speaker configuration.

A sound pressure wave 308 from a rear side of the diaphragm 304 travels through at least one passive vent 202 and passive port 126 around the diffuser 125 to the user's ear 300 and lowers a lower frequency portion of the frequency response of the speaker configuration. In this case, the sound pressure wave 308 is referred to as a passive wave that passes through the at least one passive vent 202 and the passive port 126. The passage of the active wave includes passing through a vent that is of about half the area of the passage of the passive wave. In the preferred embodiment, the path of the active wave is through a vent about 22 mm wide, and the path of the passive wave is about 45 mm wide.

Signals from the audio circuitry drive the diaphragm 304, resulting in sound pressure waves being generated from front and rear sides thereof. Sound pressure waves from the front side of diaphragm 304 travel through the passages 303, 305, 200, 124 in the housing portion 102. Sound pressure waves from the rear side of diaphragm can also 304 travel within the housing and subsequently through the passages 202, 124 in the housing portion 102 passively. The direct pressure wave 306 radiating from the active port 124 can couple to the passive wave 308 radiating from the passive port 126 around the diffuser 127. The combination of the active and passive waves can escape to open air outside housing 102.

More importantly, the resultant sound pressure at listener 300 can also travel back through the phone via path 308, 202, 126, and path 309 through 310 to open air outside the housing 102. This third porting 310 couples to the secondary porting 202 to relieve excessive low-frequency acoustic pressure between the ear placement region and the user's ear. Preferably, the third porting is vented in proximity to the secondary porting. This serves to regulate the acoustic impedance between the ear placement region and the user's ear, such that the seal of the user's ear to the ear placement region is less critical to the uniformity of the frequency response. This regulation of excessive low-frequency acoustic pressure can be achieved in part through this third path, through cancellation of the front pressure wave with the rear pressure wave of the transducer via path 308 from the listener's ear through port 202 to the back of the diaphragm 304, through an unusually larger interior volume of the phone, or any combination of the above.

With such an arrangement, portable radiotelephone 100 provides an acoustic frequency response that is substantially independent of a seal around ear placement region 114 and provides a broader area for the ear placement region wherein a uniform amplitude of acoustic pressure is achieved.

Figure 5:
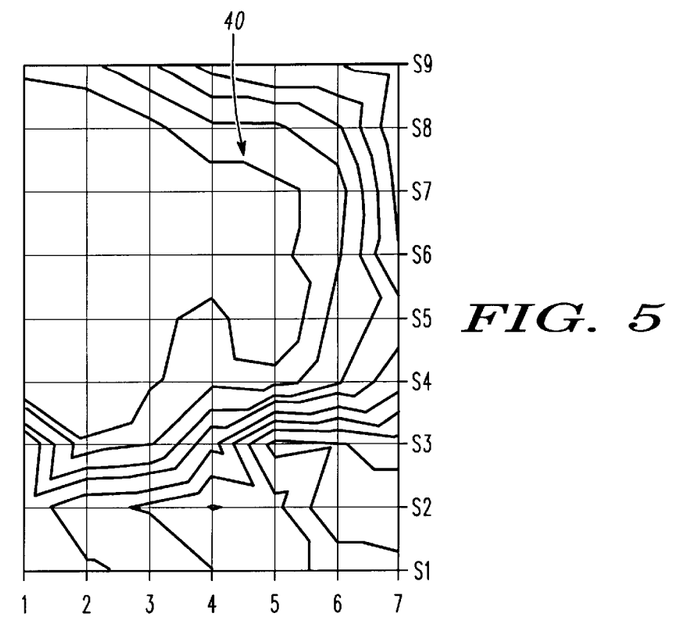
FIG. 5 is a graph of an acoustic response of the speaker configuration of the radiotelephone of FIGS. 1 and 4.

To illustrate, FIG. 5 shows a graph of equal amplitude curves of a 1 kHz tone over the ear placement region 114 (of FIG. 1) of the portable radiotelephone 100, in accordance with the present invention. Each curve represents a 3 db contour with the center of the region nominally set at about 0 db. It is nominally desired that the tone retain an amplitude within 6 db (area of two curve contours) over the ear placement region. Each square of the graph represents a 5 mm positional step, with (4, S4) being with the ear placement region of the radiotelephone centrally located on a user's ear. Row S9 would be the closest to a user's mouth and column 1 would be closest to the bottom of the user's ear. For example, moving the phone from position (4,S4) to (4,S5) would be to move the phone closer to the user's mouth. Since a user is likely to automatically center the radiotelephone side-to-side, good performance along column 4 is the most important. In other words, a user is not likely to place the radiotelephone along columns 1 or 7.

Figure 6:
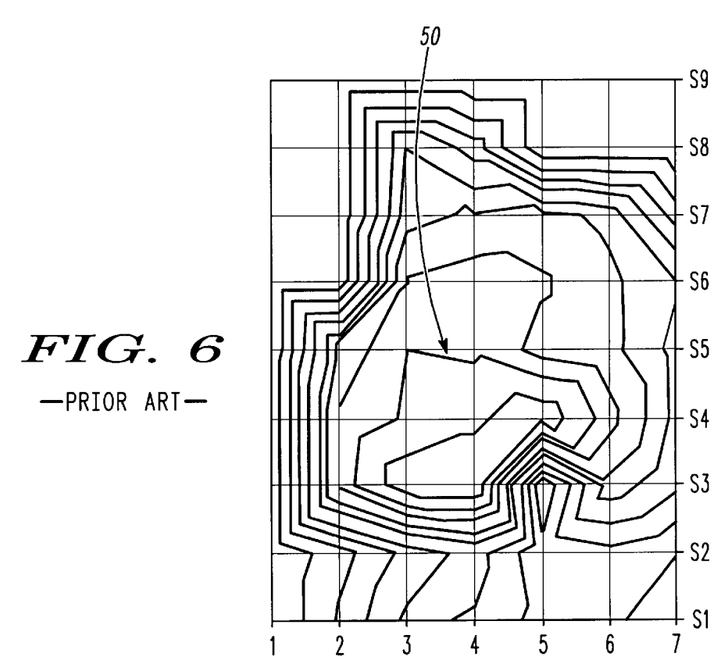
FIG. 6 is a graph of an acoustic response of a prior art speaker configuration.

FIG. 6 shows a similar test done on a prior art radiotelephone. In both cases, simulations were conducted using an artificial ear, as is known in the art, wherein the ear placement region of the radiotelephone was not sealed to the artificial ear, as occurs in real life situations. As can be seen the portable radiotelephone 100 provides an acoustic response at the 6 db point 40 that is more uniform (larger) than the 6 db contour 50 of the prior art, and is therefore less sensitive to placement around the ear placement region, and relatively insensitive to being unsealed from a user's ear. Test results were also obtained at frequencies of 315 Hz, 500 Hz, 1 kHz and 2.5 kHz with similar results.

The size, position and the number of vents and ports were chosen to achieve the desired acoustic performance. It is understood that the size, position and the number of these passages may be chosen in combination with felts, screens, meshes, or other suitable materials (shown as 309 in FIG. 4) that acoustically resist air flow to further achieve a desired frequency response. For example, felts, screens, meshes, or other suitable materials can be used for acoustic tuning purposes, as well as for protecting the speaker diaphragm from dust, dirt, etc. Such materials may be suitably disposed in or over any of the passages to provide suitable tuning of the frequency response, as such materials provide an acoustic resistance to air flow.

While particular embodiments of the present invention have been shown and described, modifications may be made. It is therefore intended in the appended claims to cover all such changes and modifications which fall within the broad scope of the invention.

What is claimed is:

1. A portable electronic device including a housing with a speaker configuration disposed therein, the speaker configuration comprising:

a speaker diaphragm having a front side and a rear side, the speaker being affixed to an inside surface of a wall of the housing with the front side of the speaker diaphragm facing the wall;

an active vent disposed in the wall such that acoustic waves produced by the front side of the speaker diaphragm can propagate through the active vent;

a passive vent disposed in the wall such that resultant acoustic waves at the listener from the active vent can propagate through the passive vent;

a first diffuser placed above the active vent, the first diffuser dispersing the acoustic waves of produced by the front side of the speaker diaphragm to outside of the housing within an ear placement region; and a second diffuser placed above the passive vent, the second diffuser placed in close proximity to the first diffuser, the first and second diffuser defining an active port therebetween being acoustically coupled to the active vent, the second diffuser and housing defining a passive port therebetween being acoustically coupled to the passive vent, the active and passive ports, being acoustically coupled within the ear placement region to provide a larger usable ear placement region for a user of the portable electronic device to obtain a more uniform frequency response from the speaker configuration than would be available from an active vent and passive vent alone.

2. The portable electronic device according to claim 1, wherein the active vent has a smaller cross-sectional area than the active port.

3. The portable electronic device according to claim 1, further comprising a chamber disposed between the active vent and active port to tune the frequency response of the speaker configuration.

4. The portable electronic device according to claim 1, further comprising third porting that couples to a passive acoustic path to relieve excessive low-frequency acoustic pressure between the ear placement region and the user's ear.

5. The portable electronic device according to claim 1, wherein the active vent and active port set a high frequency portion of the frequency response of the speaker configuration and the passive vent and passive port lower a lower frequency portion of the frequency response of the speaker configuration.

6. The portable electronic device according to claim 1, wherein the passive port is a gap porting through the housing that substantially surrounds the first port.

7. The portable electronic device according to claim 6, wherein the first port is a circular gap through the housing, and the second port forms a concentric circle about the first port.

8. The portable electronic device according to claim 1, wherein the electronic device is a portable radiotelephone.

9. A portable electronic device including a housing with a speaker configuration disposed therein, the speaker configuration comprising:
   a speaker diaphragm having a front side and a rear side, the speaker being affixed to an inside surface of a wall of the housing with the front side of the speaker diaphragm facing the wall;
   an active vent disposed in the wall such that acoustic waves produced by the front side of the speaker diaphragm can propagate through the active vent, the active vent controlling the upper frequency extent of the frequency response;
   a chamber disposed in the wall of the housing directly above the active vent, the chamber tuning the acoustic response of the acoustic waves produced by the front side of the speaker diaphragm propagating through the active vent;
   a passive vent subtending a larger area than the active vent, the passive vent disposed in the wall such that acoustic waves present at the listener's ear due to the active vent can propagate through the housing and then to the outside world;
   a first diffuser placed above the chamber, the first diffuser dispersing the acoustic waves produced by the front side of the speaker diaphragm through the active vent to outside of the housing within an ear placement region; and
   a second diffuser placed above the passive vent, the second diffuser placed in close proximity to the first diffuser, the first and second diffuser defining an active port therebetween being acoustically coupled to the active vent, the second diffuser and housing defining a passive port therebetween being acoustically coupled to the passive vent,
   the active and passive ports being acoustically coupled within the ear placement region to provide a larger usable ear placement region for a user of the portable electronic device to obtain a more uniform frequency response from the speaker configuration than would be available from an active and passive vent alone.

10. The portable electronic device according to claim 9, wherein the active vent has a smaller cross-sectional area than the active port.

11. The portable electronic device according to claim 9, further comprising third porting that couples a passive acoustic path to relieve excessive low-frequency acoustic pressure between the ear placement region and the user's ear.

12. The portable electronic device according to claim 9, wherein the active vent and active port set a high frequency portion of the frequency response of the speaker configuration and the passive vent and passive port lower a lower frequency portion of the frequency response of the speaker configuration to provide a substantially uniform frequency response.

13. The portable electronic device according to claim 9, wherein the passive port is a gap porting through the housing that substantially surrounds the first port and is proximate thereto.

14. The portable electronic device according to claim 13, wherein the first port is a circular gap through the housing, and the second port forms a concentric circle about the first port.

15. A portable electronic device including a housing with a speaker configuration disposed therein, the speaker configuration comprising:
   a speaker diaphragm having a front side and a rear side, the speaker being affixed to an inside surface of a wall of the housing with the front side of the speaker diaphragm facing the wall;
   an active vent disposed in the wall such that acoustic waves produced by the front side of the speaker diaphragm can propagate through the active vent;
   a passive vent having a longer acoustic length from the speaker diaphragm than the active vent, the passive vent disposed in the wall such that acoustic waves produced by the rear side of the speaker diaphragm can propagate through the passive vent;
   a first diffuser placed above the chamber, the first diffuser dispersing the acoustic waves produced by the front side of the speaker diaphragm through the active vent to outside of the housing within an ear placement region; and
   a second diffuser placed above the passive vent, the second diffuser dispersing the acoustic waves produced by the rear side of the speaker diaphragm to outside of the housing within the ear placement region, the first and second diffuser defining an active port therebetween being acoustically coupled to the active vent and having a large cross-sectional area than the active vent, the second diffuser and housing defining a passive port therebetween being acoustically coupled to the passive vent,
   the active and passive ports being proximate to each other and acoustically coupled within the ear placement region to provide a larger usable ear placement region for a user of the portable electronic device to obtain a more uniform frequency response from the speaker configuration than would be available an active vent alone.

16. The portable electronic device according to claim 15, further comprising a chamber disposed in the wall of the housing directly above the active vent, the chamber tuning the acoustic response of the acoustic waves produced by the front side of the speaker diaphragm propagating through the active vent.

17. The portable electronic device according to claim 15, further comprising third porting that couples to a passive acoustic path to relieve excessive low-frequency acoustic pressure between the ear placement region and the user's ear.

18. The portable electronic device according to claim 15, wherein the active vent and active port set a high frequency portion of the frequency response of the speaker configuration and the passive vent and passive port lower a lower frequency portion of the frequency response of the speaker configuration to provide a substantially uniform frequency response.

19. The portable electronic device according to claim 15, wherein the passive port is a gap porting through the housing that substantially surrounds the first port.

20. The portable electronic device according to claim 19, wherein the first port is a circular gap through the housing, and the second port forms a concentric circle about the first port.

* * * * *